No. 890,392. PATENTED JUNE 9, 1908.
J. Q. ADAMS.
ROTARY ENGINE.
APPLICATION FILED JAN. 13, 1908.

2 SHEETS—SHEET 1.

WITNESSES
INVENTOR
John Q. Adams
Woodward & Chandlee
Attorneys

No. 890,392. PATENTED JUNE 9, 1908.
J. Q. ADAMS.
ROTARY ENGINE.
APPLICATION FILED JAN. 13, 1908.
2 SHEETS—SHEET 2.
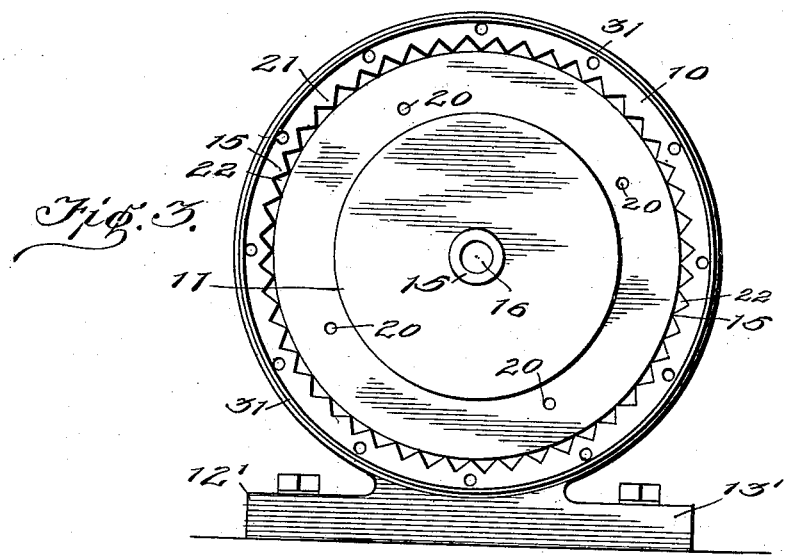
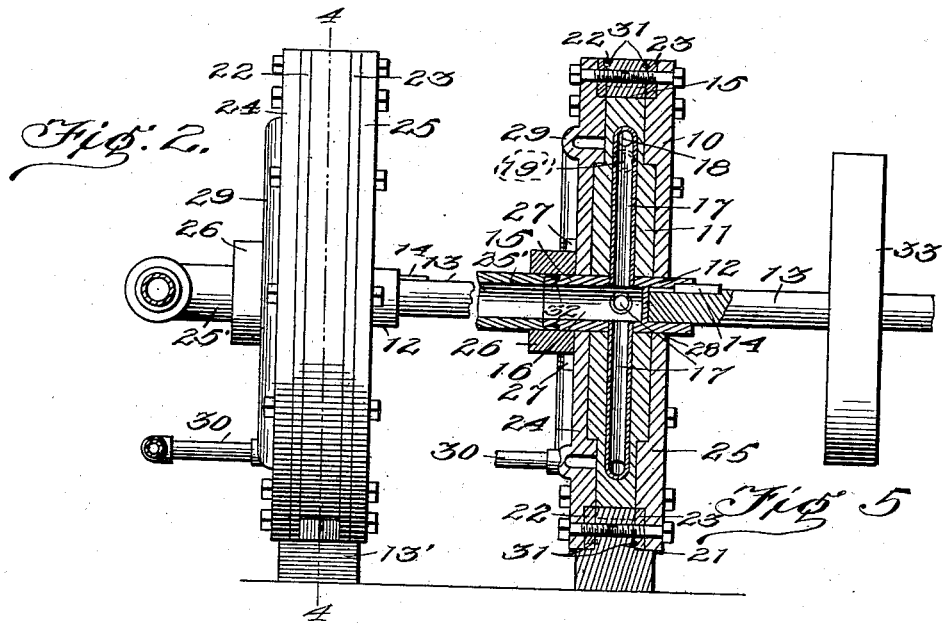
INVENTOR
John Q. Adams

UNITED STATES PATENT OFFICE.

JOHN QUINCY ADAMS, OF WEST UNION, IOWA.

ROTARY ENGINE.

No. 890,392.     Specification of Letters Patent.     Patented June 9, 1908.

Application filed January 13, 1908. Serial No. 410,628.

*To all whom it may concern:*

Be it known that I, JOHN QUINCY ADAMS, a citizen of the United States, residing at West Union, in the county of Fayette and State of Iowa, have invented certain new and useful Improvements in Rotary Engines, of which the following is a specification.

This invention relates to rotary steam engines, and has for an object to provide an engine of this character which may be run at a maximum rate of speed with a minimum expenditure of fuel.

A further object of this invention is to provide an engine of this character which will be simple in its structure, and which will occupy but small floor space.

A further object of this invention is to provide an engine of this character in which a head is located within a stationary cylinder, the head having live steam passages and arranged to deliver steam against an inner impact surface formed upon the inner periphery of the stationary cylinder, and thus produce a rotary movement of the head within the cylinder.

Other objects and advantages will be apparent from the following description and it will be understood that changes in the specific structure shown and described may be made within the scope of the claims without departing from the spirit of the invention.

Figure 1:
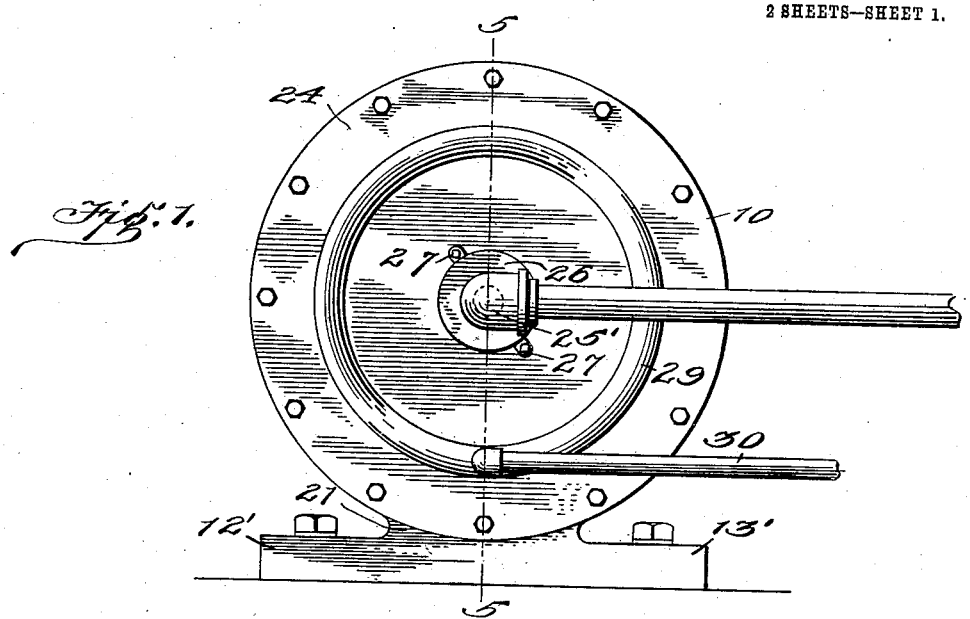
Figure 4:
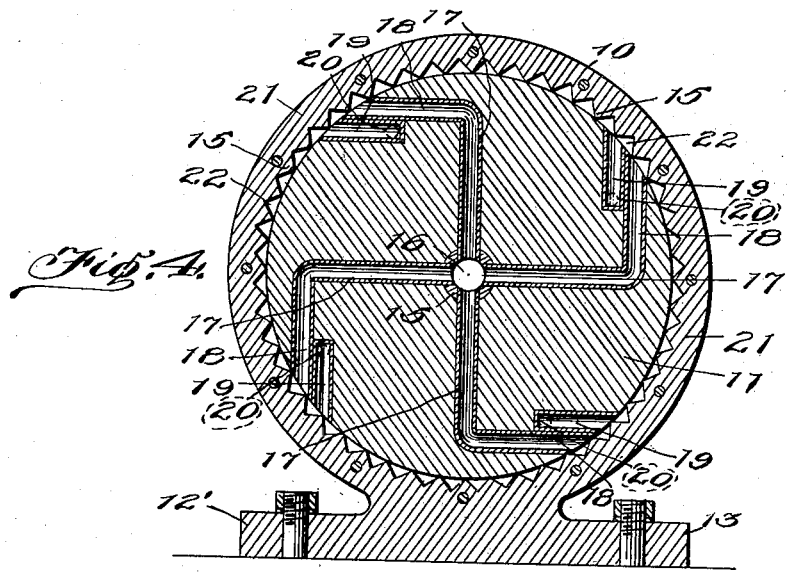

In the drawings forming a portion of this specification, and in which like numerals of reference indicate similar parts in the several views, Figure 1 is a side elevational view of the present engine, Fig. 2 is an end elevational view, Fig. 3 is a side elevational view showing one side of the casing removed, Fig. 4 is a vertical longitudinal sectional view on the line 4—4 of Fig. 2, Fig. 5 is a vertical cross sectional view on the line 5—5 of Fig. 1.

Referring now more particularly to the drawings, there is shown an engine 10 consisting of a rotary wheel or head 11, having a lateral hub 12 at one side, as shown. The hub is thus arranged to receive a shaft 13 keyed to the hub as at 14. The wheel opposite the hub 12 is provided with a similar hub 15 and this hub is provided with a cavity 16 and thus serves as a steam inlet.

The wheel or head 11 is provided with a plurality of radial pipes 17, four being shown in the drawings and at the center these pipes are in communication with the steam inlet cavity 16. At the outer ends, these pipes are connected with short pipes 18 which extend at right angles to the pipes 17 which open outwardly of the wheel or head 11. Located beneath the pipes 18, there are shown similar pipes 19 which also open outwardly of the head 11, as shown. The pipes 19 are provided with lateral passages 20 for a purpose to be hereinafter described. This construction thus provides a perfectly smooth peripheral bearing edge with the pipes 18 and 19 respectively opening to its surface.

The wheel or head is disposed within a casing 21 which is preferably in the form of a ring, as shown, and this casing is provided at its lower end with flanges 12′ and 13′ respectively by means of which the engine may be bolted upon a suitable flooring. The casing is provided on its inner periphery with substantially V shaped teeth or corrugations 15, and these teeth or corrugations are thus arranged to extend toward the wheel or head 11 with their points clearing the wheel, as shown.

The casing is provided with washer plates 22 and 23 respectively, and these plates are of a width to cover the casing 21 and the depth of the teeth 15, and connected with the washer plates 22 and 23 respectively, there are shown, side plates 24 and 25 respectively provided to complete the casing described and the plate 24 is provided with a passage at its center to receive a steam inlet pipe 25′. The inlet pipe 25′ is secured to the plate 24 by a collar 26 bolted as at 27 to the plate. The inlet pipe is thus in communication with the cavity 16. The plate 24 is provided with a passage 28 disposed over the hub 12, as shown. The outer edges of the plates 24 and 25 respectively are bolted together, through the thick part of the teeth 15.

Secured upon the plate 24, there is shown a half pipe 29, and the open side of this pipe is in communication with the passages 20 formed in the pipes 19. The pipe 29 is provided with an exhaust outlet pipe 30. The wheel or head 11 is provided with packing rings 31, and the steam inlet pipe is provided with a packing, as shown at 32. The shaft 13 is provided with a balance wheel 33.

In the operation of the engine, steam is admitted to the hollow hub 15 whereupon the steam will be discharged through the radial pipes 17 and thence into the pockets 22, formed by the teeth 15, whereupon the steam will be forced against the teeth 15, and the impact of steam against these teeth will of course revolve the head or wheel 16. After the steam has been spent, it will pass to the pipes 19, and exhaust through the ports 20 to be discharged through the pipe 30, as is obvious.

What is claimed is:

1. In a rotary engine, the combination with a stationary annular casing having steam impact teeth on its inner periphery, plates bolted to the sides of said casing, one of said plates having an annular chamber opening within the casing, of a piston revolubly mounted within the casing and having a plurality of angular steam inlet passages opening on the impact teeth, said piston having a plurality of exhaust ports located adjacent the outer ends of said passages and opening into the annular chamber, a steam exhaust pipe connected with the annular chamber and a source of steam supply connected with the annular passages.

2. A rotary engine comprising a stationary annular casing having steam impact teeth on its inner periphery, a revoluble piston located within the casing, plates bolted to the sides of said casing, one of said plates having an annular chamber opening on the piston, said piston having a plurality of radially disposed steam inlet passages opening on the impact teeth, said piston having a plurality of exhaust ports located adjacent the outer ends of said steam inlet passages and opening onto the teeth and into the annular chamber respectively, a steam exhaust pipe connected with said annular chamber, and a source of steam supply connected with said steam inlet passages.

In testimony whereof I affix my signature, in presence of two witnesses.

JOHN QUINCY ADAMS.

Witnesses:
CARL EVANS,
F. Y. WHITMORE.